(12) United States Patent
Palin et al.

(10) Patent No.: US 7,702,284 B2
(45) Date of Patent: Apr. 20, 2010

(54) METHOD AND SYSTEM FOR PROCESSING ACKNOWLEDGMENTS IN A WIRELESS COMMUNICATIONS NETWORK

(76) Inventors: Arto Palin, Rantatie 39, 37839 Viiala (FI); Juha Salokannel, Toikantic 6B 13, 36240 Kongasala (FI); Jukka Reunamäki, Elementinpolku 15 C 32, 33720 Tampere (FI)

( * ) Notice: Subject to any disclaimer, the term of this patent is extended or adjusted under 35 U.S.C. 154(b) by 1349 days.

(21) Appl. No.: 10/660,545

(22) Filed: Sep. 12, 2003

(65) Prior Publication Data

US 2005/0058116 A1   Mar. 17, 2005

(51) Int. Cl.
*H04B 17/00* (2006.01)
*H04L 1/00* (2006.01)
*H04L 7/00* (2006.01)

(52) U.S. Cl. .............. 455/67.11; 370/216; 375/358
(58) Field of Classification Search .............. None
See application file for complete search history.

(56) References Cited

U.S. PATENT DOCUMENTS

| | | | |
|---|---|---|---|
| 5,307,370 A | 4/1994 | Eness | |
| 5,677,927 A | 10/1997 | Fullerton et al. | |
| 5,687,169 A | 11/1997 | Fullerton | |
| 6,144,464 A | 11/2000 | Rupp et al. | |
| 6,172,673 B1 | 1/2001 | Lehtinen et al. | |
| 6,349,199 B1* | 2/2002 | Armantrout | 455/67.11 |
| 6,507,734 B1 | 1/2003 | Berger et al. | |
| 6,539,503 B1 | 3/2003 | Walker | |
| 6,549,567 B1 | 4/2003 | Fullerton | |
| 6,571,089 B1 | 5/2003 | Richards et al. | |
| 6,571,212 B1 | 5/2003 | Dent | |
| 6,587,949 B1 | 7/2003 | Steinberg | |
| 6,799,287 B1 | 9/2004 | Sharma et al. | |
| 6,961,541 B2 | 11/2005 | Overy et al. | |
| 6,993,343 B2 | 1/2006 | Yoshii et al. | |
| 7,096,033 B1 | 8/2006 | Bell | |
| 2001/0029523 A1* | 10/2001 | Mcternan et al. | 709/205 |
| 2001/0049262 A1 | 12/2001 | Lehtonen | |
| 2001/0055356 A1* | 12/2001 | Davies | 375/358 |

(Continued)

FOREIGN PATENT DOCUMENTS

CA    2443871 A1    2/2003

(Continued)

OTHER PUBLICATIONS

U.S. Appl. No. 10/870,060, filed Jun. 18, 2004, Kossi, et al.

(Continued)

*Primary Examiner*—Nick Corsaro
*Assistant Examiner*—Joel Ajayi
(74) *Attorney, Agent, or Firm*—Connolly Bove Lodge & Hutz LLP

(57) ABSTRACT

A method and system of controlling a multicast transmission. The method and system transmits a data packet to multiple slave devices across a UWB wireless network, and detects the reception of any acknowledgement transmissions. These acknowledgement transmissions indicate reception of the data packet by the slave devices. In addition, the method and system retransmit the data packet to at least one of the slave devices when an acknowledgment is not detected for each of the slave devices. The acknowledgments may be received from the UWB network.

20 Claims, 11 Drawing Sheets

U.S. PATENT DOCUMENTS

| | | |
|---|---|---|
| 2002/0003792 A1* | 1/2002 | Schmidl et al. ............. 370/343 |
| 2002/0065099 A1 | 5/2002 | Bjorndahl |
| 2002/0073269 A1 | 6/2002 | Kawashima et al. |
| 2002/0080866 A1 | 6/2002 | Bouet et al. |
| 2002/0136268 A1* | 9/2002 | Gan et al. .................. 375/133 |
| 2002/0151276 A1 | 10/2002 | Ito |
| 2003/0032422 A1 | 2/2003 | Wynbeek |
| 2003/0063196 A1 | 4/2003 | Palatov et al. |
| 2003/0078037 A1 | 4/2003 | Auckland et al. |
| 2003/0100288 A1* | 5/2003 | Tomlinson, Jr. et al. ..... 455/402 |
| 2003/0108010 A1 | 6/2003 | Kim et al. |
| 2003/0137966 A1 | 7/2003 | Odman et al. |
| 2003/0147453 A1* | 8/2003 | Batra .......................... 375/132 |
| 2003/0148767 A1 | 8/2003 | Sugaya et al. |
| 2003/0203741 A1 | 10/2003 | Matsuo et al. |
| 2004/0066762 A1 | 4/2004 | Alastalo |
| 2004/0204076 A1 | 10/2004 | Kotzin |
| 2004/0219897 A1 | 11/2004 | Choi |
| 2005/0031051 A1* | 2/2005 | Rosen et al. ................ 375/295 |
| 2005/0037775 A1 | 2/2005 | Moeglein et al. |
| 2005/0058107 A1 | 3/2005 | Salokannel et al. |
| 2005/0058152 A1 | 3/2005 | Oksanen et al. |
| 2005/0059345 A1 | 3/2005 | Palin et al. |
| 2005/0078598 A1 | 4/2005 | Batra et al. |
| 2005/0097408 A1 | 5/2005 | Palin et al. |
| 2005/0193309 A1 | 9/2005 | Grilli et al. |
| 2005/0283207 A1 | 12/2005 | Hochmair et al. |

FOREIGN PATENT DOCUMENTS

| | | |
|---|---|---|
| DE | 10140446 A1 | 3/2003 |
| EP | 0999717 A2 | 5/2000 |
| EP | 1 185 033 A1 | 3/2002 |
| EP | 1274194 A1 | 1/2003 |
| GB | 2 287 383 | 9/1995 |
| WO | WO 99/38302 | 7/1999 |
| WO | WO 99/41876 | 8/1999 |
| WO | WO 01/45319 | 6/2001 |
| WO | WO 02/21746 A2 | 3/2002 |
| WO | WO 03/084146 A1 | 10/2003 |

OTHER PUBLICATIONS

The Bluetooth Special Interest Group, Specification of The Bluetooth System, vol. 1 & vol. 2, Core and Profiles: Version 1.1, Feb. 22, 2001.

O'Donnell et al., "An Integrated, Low Power, Ultra-Wideband Transceiver Architecture for Low-Rate, Indoor Wireless Systems", Dept. of Electrical Engineering & Computer Science, University of California, Berkeley, Berkeley, CA, 8 pgs.

P. I. I. Withington, et al., "An Impulse Radio Communication System", "Proceedings of the International Conference on Ultra-Wideband, Short Pulse Electromagnetics", (ISBN 0-306-44530-1), Oct. 19, 1992, pp. 113-200.

J. Bray and C. Sterman, "Bluetooth 1.1—Connect Without Cables", Prentice Hall Inc., Upper Saddle River, NJ 1002 (ISBN 0-13-066106-6), Sects. 5.4., pp. 70-78.

D. J. Costello, Jr., et al., "Applications of Error-Control Coding", IEEE Transactions of Information Theory, Oct. 1998, vol. 44, pp. 2531-2560.

Walter Hirt, "Ultra-wideband radio technology: overview and future research", Computer Communications, Amsterdam, NL, vol. 26, No. 1, Feb. 2003, pp. 46-52.

* cited by examiner

METHOD AND SYSTEM FOR PROCESSING ACKNOWLEDGMENTS IN A WIRELESS COMMUNICATIONS NETWORK

FIELD OF THE INVENTION

The present invention relates to wireless communications. More particularly, the present invention relates to techniques for processing acknowledgments in wireless networks.

BACKGROUND OF THE INVENTION

Since gaining approval by the Federal Communications Commission (FCC) in 2002, ultra wideband (UWB) techniques have become an attractive solution for short-range wireless communications because they allow for devices to exchange information at relatively high data rates.

Although UWB systems for short-range networks are relatively new, their transmission techniques have been known for decades. In fact, the first radio transmission was made by a UWB technique when Heinrich Hertz discovered radio waves in 1887. This discovery was made with a spark gap transmitter, which can be viewed as an early UWB radio. Later on, such transmitters were banned because they emitted wide spectrum transmissions.

Current FCC regulations permit UWB transmissions for communications purposes in the frequency band between 3.1 and 10.6 GHz. However, for such transmissions, the spectral density has to be under −41.3 dBm/MHz and the utilized bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps makes IR much more immune to multipath propagation problems than conventional continuous wave radios. RF gating is a particular type of IR in which the impulse is a gated RF pulse. This gated pulse is a sine wave masked in the time domain with a certain pulse shape.

IR transmission facilitates a relatively simple transmitter design, which basically requires a pulse generator and an antenna. This design does not necessarily require a power amplifier, because transmission power requirements are low. In addition, this design does not generally require modulation components such as voltage controlled oscillators (VCOs) and mixers, because the impulses are baseband signals.

In general, IR receiver designs are more complex than their corresponding transmitter designs. However, these designs are much simpler than conventional receiver designs because they typically do not employ intermediate frequency (IF) signals or filters. However, to fulfill spectral requirements, IR impulses have to be very short in duration (e.g., a couple of nanoseconds). This requirement places stringent timing demands on receiver timing accuracy. The fulfillment of these demands can also provide IR receivers with accurate time resolution and positioning capabilities.

Multicast transmission techniques are well suited for UWB networks. Multicast transmissions involve sending information to multiple recipients simultaneously. Accordingly, such transmissions can conserve bandwidth and reduce transmission latencies. Applications such as data downloading and videoconferencing are well suited for multicast transmission.

It is desirable that recipients acknowledge receipt of transmitted information to ensure that recipients receive transmitted information and to instill confidence in the performance of a communications system. Also, current FCC regulations require that acknowledgment information is sent in UWB systems so that a transmitter knows that an associated receiver is available. Accordingly, there is a current need for techniques involving the processing of acknowledgments.

SUMMARY OF THE INVENTION

The present invention is directed to a method and system of controlling a multicast transmission. The method and system transmits a data packet to multiple slave devices across a UWB wireless network, and detects the reception of any acknowledgement transmissions. These acknowledgement transmissions indicate reception of the data packet by the slave devices. In addition, the method and system retransmit the data packet to at least one of the slave devices when an acknowledgment is not detected for each of the slave devices. The acknowledgments may be received from the UWB network or a transmission media different than the UWB network such as Bluetooth.

The method and system may also count the number of consecutive times an acknowledgement packet is not received from a particular slave device. The method and system forgoes retransmission when this number of times exceeds a predetermined threshold and when an acknowledgement transmission is detected from the each of the multiple slave devices except for the particular slave device.

Detecting the presence of acknowledgments may include correlating received signals with a predetermined acknowledgement sequence during a time slot allocated to the slave devices. This may involve generating a correlation signal and counting the number of times the correlation signal exceeds a predetermined threshold. When it exceeds this threshold fewer times than the number of slave devices, retransmission is requested. Alternatively, this may involve determining whether the correlation signal exceeds a predetermined threshold during each of a plurality time slots, where each time slot is allocated to a particular slave device.

In addition, the present invention is directed to a wireless communications device. This device includes a transmission buffer that stores a packet for transmission to multiple slave devices, and a retransmission buffer that stores a retransmission packet that was previously transmitted across the UWB wireless network. In addition, device includes a retransmission controller that receives one or more acknowledgment transmissions from the slave devices. The retransmission controller causes the retransmission buffer to send the retransmission packet to the plurality of slave devices when an acknowledgment is not detected for each of the slave devices.

A computer-readable medium may be encoded with processing instructions for implementing the various method and functions herein, such as controlling a multicast transmission, to be performed by a computerized system which can be embodied in wireless communications device.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
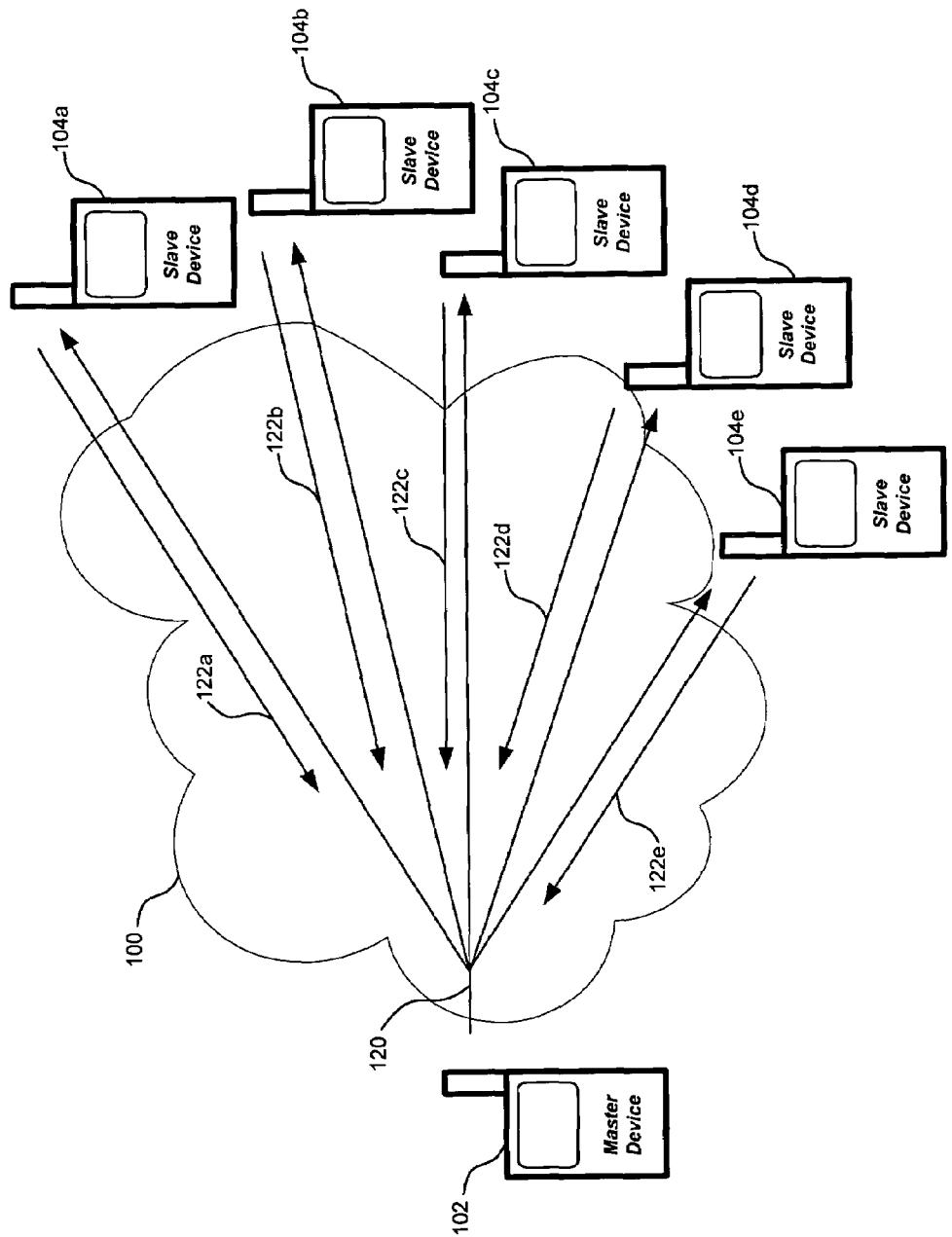
FIG. 1 is a diagram of an exemplary operational environment in accordance with one embodiment.

Before describing the invention in detail, it is helpful to describe an environment in which the invention may be used. Accordingly, FIG. 1 is a diagram of an exemplary multicast environment, which includes a master communications device 102 and a plurality of slave communications devices 104. As shown in FIG. 1, these devices communicate with each other through a network 100. Such communications may involve radio frequency (RF) transmissions across a wireless medium.

Communications between master device 102 and slave devices 104 include upstream traffic and downstream traffic. Downstream traffic is originated by master device 102 and directed to slave devices 104, while upstream traffic is originated by slave devices 104 and directed to master device 102.

As downstream traffic, FIG. 1 shows a multicast transmission 120, which device 102 sends to each of devices 104 simultaneously. Transmission 120 may be in the form of UWB signals. The data rates associated with these signals may depend on the distances between devices 102 and 104. For instance, if these devices are separated by distances of a few meters, these signals can convey information a rates on the order of 1.0 gigabits per second.

As upstream traffic, FIG. 1 shows slave devices 104a-e sending transmissions 122a-e to master device 102. Like multicast transmission 120, each of transmissions 122 may be in the form of UWB signals. However, transmissions 122 may also be in other forms. For instance, transmissions 122 may be traditional carrier-based wireless signals transmitted according to a short-range ad hoc wireless networking standard, such as Bluetooth. Further, transmissions 122 may be conveyed across different media than transmissions 120, such as generally shown by transmissions 1000a-e in FIG. 10.

Figure 10:
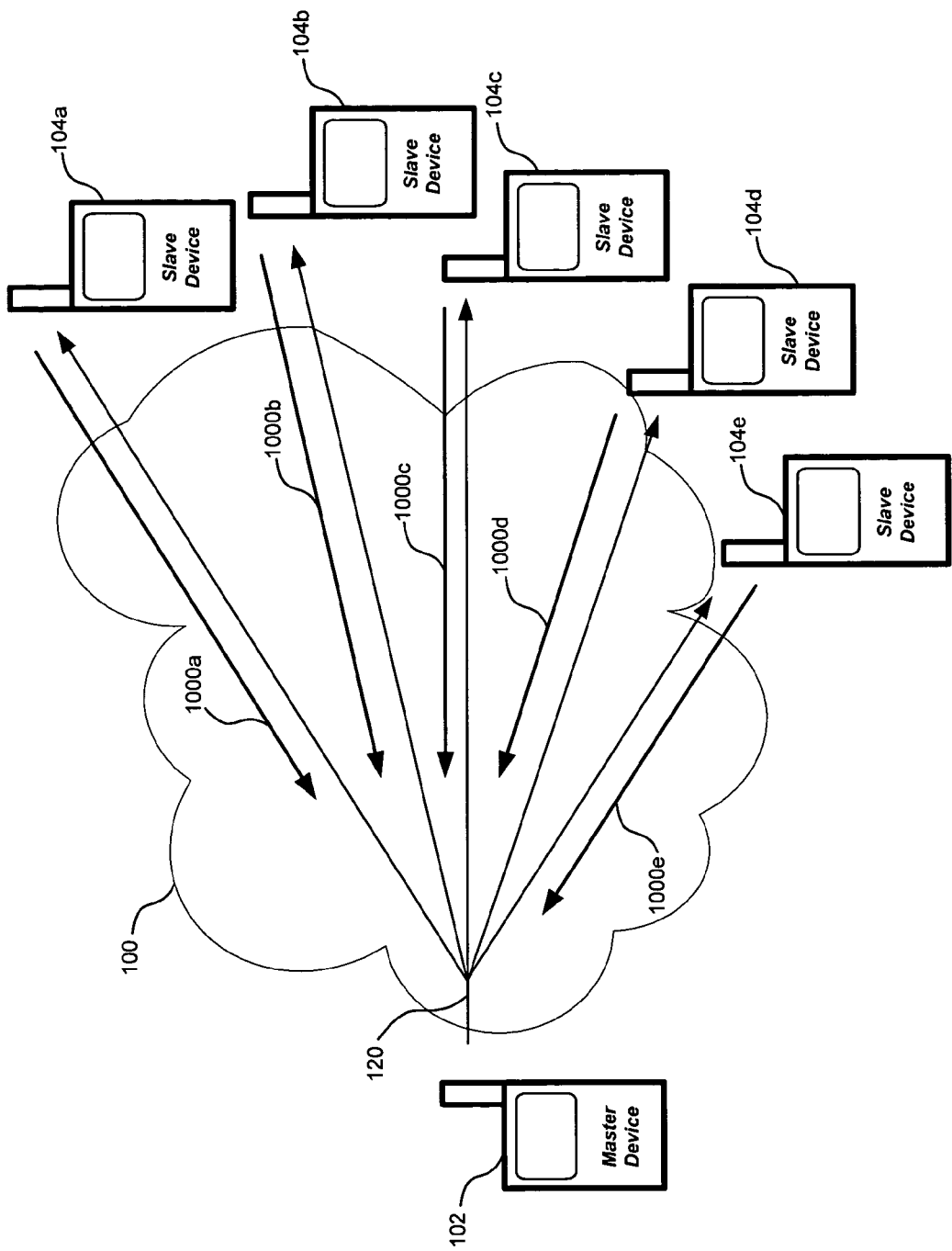
FIG. 10 is a diagram of an exemplary operational environment in accordance with one embodiment.

In the example of FIG. 10, the other transmission media 1000a-e different than transmissions 120 may take the form of Bluetooth and may be employed to transmit control signals or other data, such as automatic repeat request (ARQ) data (e.g., Acknowledgement or Non-Acknowledgment). Transmission 1000a-e may be performed via a single Bluetooth link or channel by time-slotting the slave devices 104a-e or multiple Bluetooth links or channels. Techniques for employing different transmission media for data transmissions and control data transmissions are described in U.S. application Ser. No. 10/660,549, entitled "Method And System For Repeat Request In Hybrid Ultra Wideband—Bluetooth Radio," filed on even date herewith. This application is incorporated herein by reference in its entirety.

Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

Turning back to FIG. 1, in embodiments of the present invention, slave devices 104 use the same transmission media to send transmissions 122 to master device 102. Accordingly one or more multiple access techniques may be employed. One such multiple access technique is time division multiple access (TDMA). TDMA is a transmission scheme that allows a number of devices to transmit information across a single channel (e.g., a single UWB channel) without interference. This is achieved by allocating unique time slots to each device.

Figure 2:
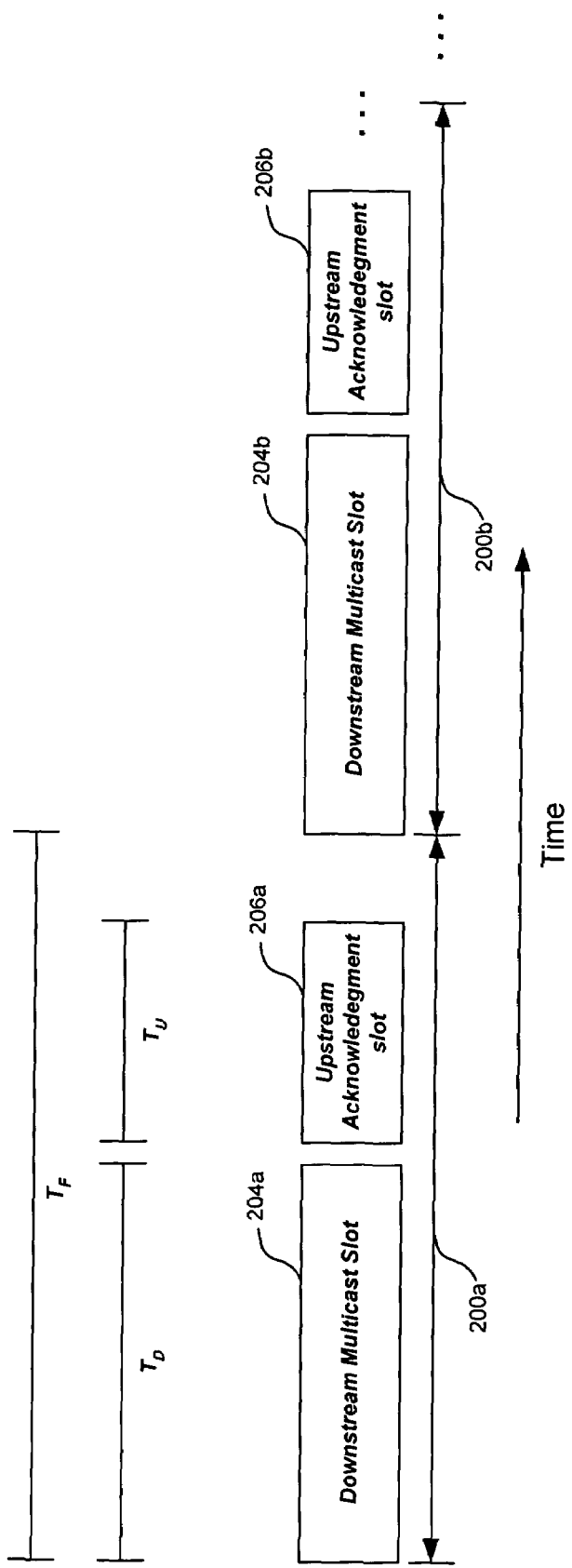
FIG. 2 is a diagram illustrating an exemplary allocation of time slots within a time division multiple access (TDMA) frame.

According to TDMA, transmissions 120 and 122 are transmitted during corresponding time slots that occur within a repeating TDMA frame. FIG. 2 is a diagram illustrating an exemplary allocation of time slots within a TDMA frame 200. As shown in FIG. 2, a TDMA frame 200 has a time duration $T_F$ that is divided into a downstream multicast slot 204 and an upstream acknowledgement slot 206. As shown in FIG. 2, time slot 204 has a time duration $T_D$ and time slot 206 has a time duration $T_U$.

During each time slot 204, master device 102 may transmit information (e.g., multicast transmission 120) to slave devices 104. For each particular time slot 204, this information may be in the form of a packet having a header portion and a data portion. The header portion may include overhead information, such as a sequence number as well as a cyclical redundancy check (CRC) or other form of error correction coding. As described above, such packets may be in the form of UWB signals.

Upstream acknowledgement time slot 206 is allocated to the slave devices 104 so that they may transmit information to master device 102. In particular, slave devices 104 may transmit information to master device 102 during time slot 206, which acknowledges receipt of the transmission sent by master device 102 in the preceding time slot 204. As described above, transmissions during time slot 206 may be in the form of UWB signals.

Figure 3A:
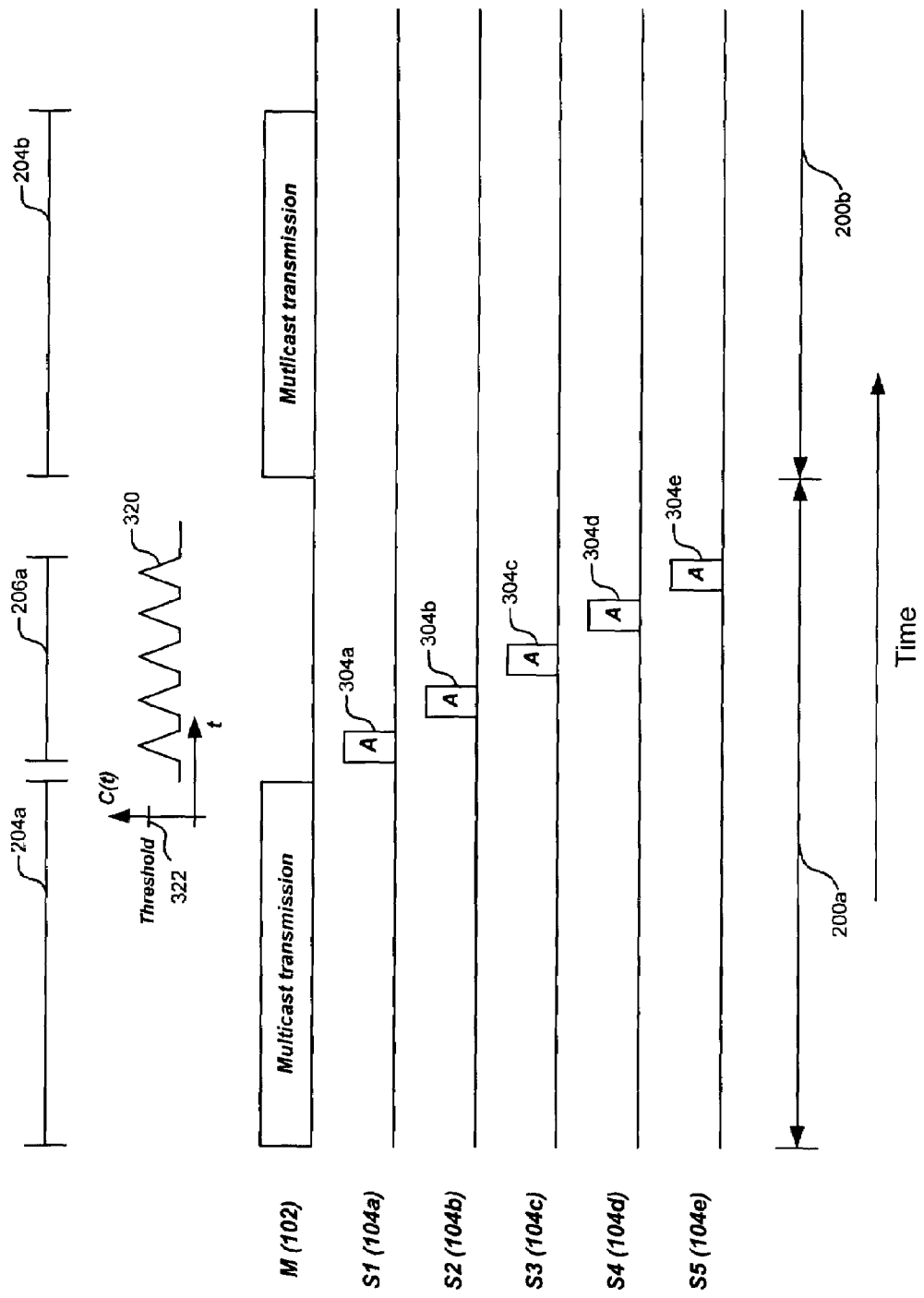
FIGS. 3A and 3B provide examples of TDMA transmissions.
Figure 3B:
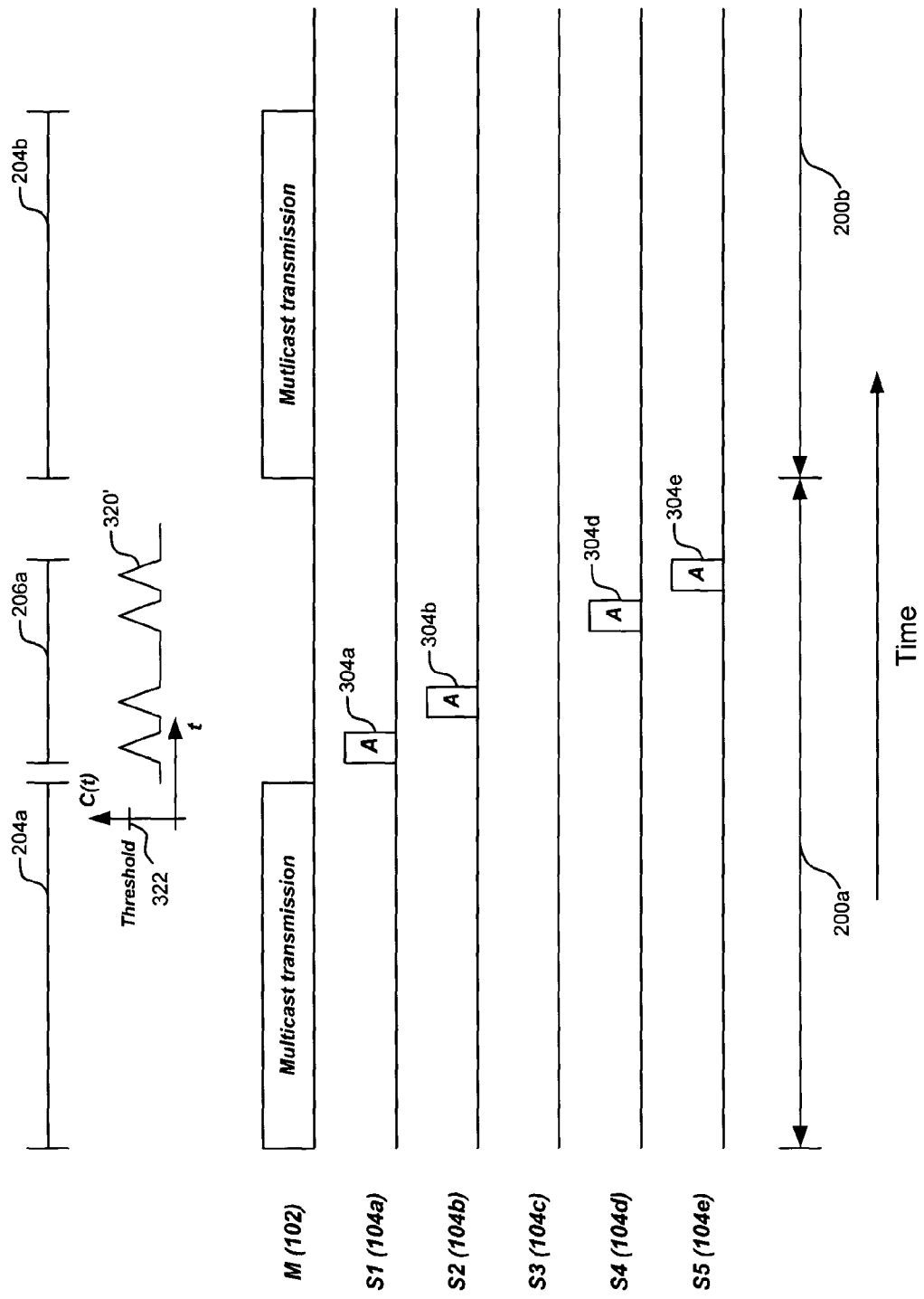

To prevent collisions between transmissions, each slave device 104 may be allocated a particular portion of time slot 206. These particular portions are referred to herein as minislots. FIGS. 3A and 3B provide an example of such minislots.

As shown in FIG. 3A, each slave device 104 is allocated a minislot 304 within time slot 206. In particular, slave device 104a (S1) is assigned minislot 304a, slave device 104b (S2) is assigned minislot 304b, slave device 104c (S3) is assigned minislot 304c, slave device 104d (S4) is assigned minislot 304d, and slave device 104e (S5) is assigned minislot 304e.

During each of minislots 304, the corresponding slave device transmits an acknowledgement to master device 102 if it received the transmission sent by master device 102 in the preceding time slot 204. Each of these acknowledgements may be in the form of a packet having a header portion and a data portion. As described above, such packets may be in the form of UWB signals. However, other types of signals are also within the scope of the present invention.

During time slot 206, master device 102 detects any acknowledgement transmissions received from slave devices 104. This detection may involve generating a signal 320 based on signals received from network 100 during time slot 206. Signal 320 may be generated by correlating such signals with a stored acknowledgement sequence.

As shown in FIG. 3A, each of slave devices 104*a-e* transmits an acknowledgment (A) to master device 102 during time slot 206. Master device 102 detects each acknowledgment when signal 320 exceeds a predetermined threshold 322 during the corresponding minislot 304. Accordingly, signal 320 exceeds threshold 322 during each of minislots 304*a-e*.

FIG. 3B is similar to FIG. 3A. However, in FIG. 3B, slave device 104 does not transmit an acknowledgment to master device 102. As a result, master device 102 generates a signal 320', which does not exceed threshold 322 during minislot 304*c*. Accordingly, master device 104 detects an acknowledgment from each of slave device 104, except for slave device 104*c*.

When master device 104 does not detect an acknowledgment from one or more slave devices 104, it may retransmit the information (e.g., packet) of the previous time slot 204 in the next time slot 204.

While FIGS. 3A and 3B show slave devices acknowledging the receipt of multicast transmissions after each downstream time slot, embodiments in which slave devices transmit an acknowledgment only after reception of multiple downstream time slots are within the scope of the present invention. Such embodiments may employ a TDMA frame format in which only certain frames include time slots for the transmission of upstream acknowledgments.

II. Wireless Communications Device

Figure 4:
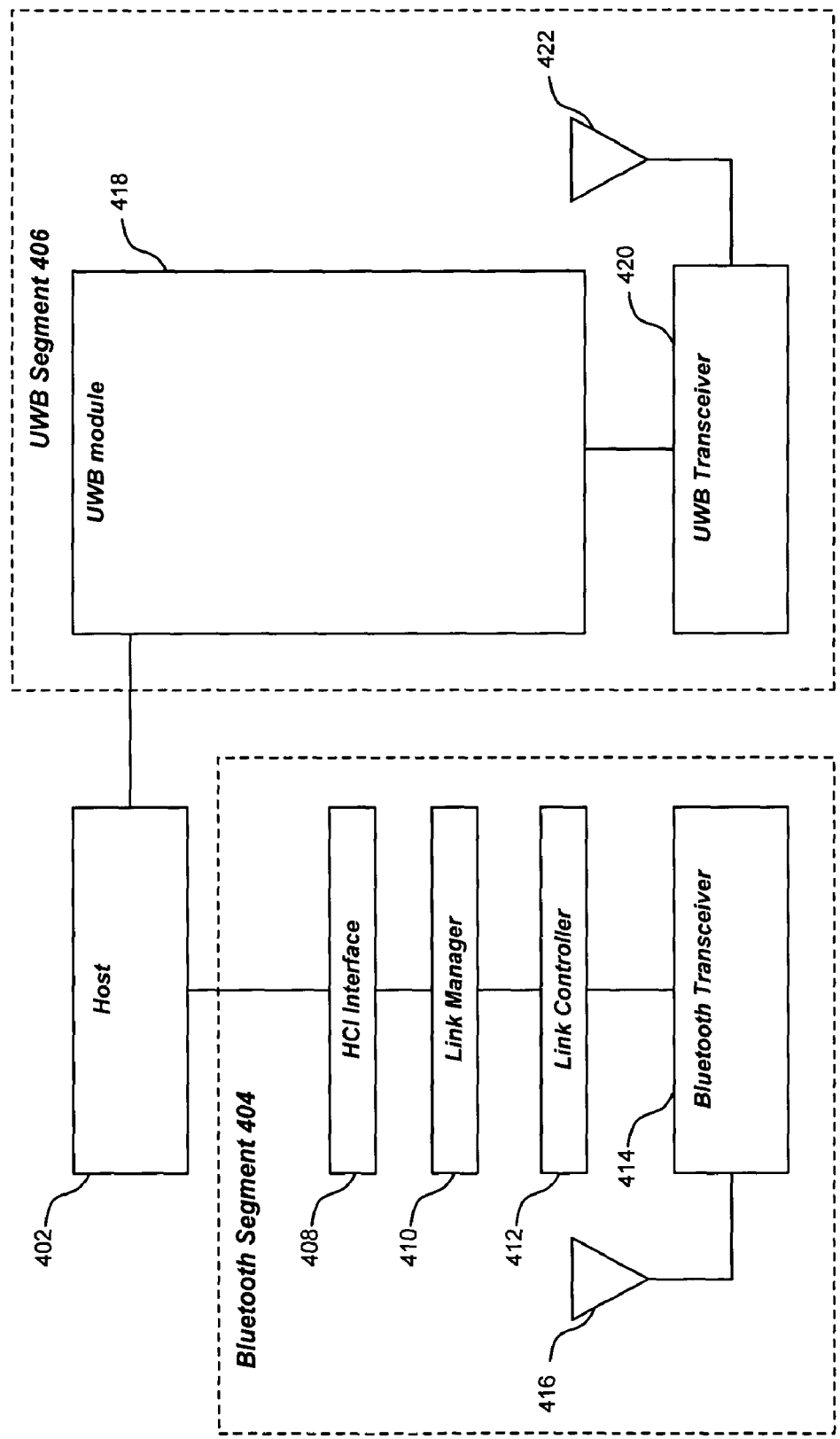
FIG. 4 is a block diagram showing an exemplary wireless communications device architecture.

FIG. 4 is a block diagram showing an exemplary wireless communications device architecture, which may be used for devices 102 and 104. Although this architecture is described in the context of Bluetooth and UWB communications, it may be employed with other wireless communications technologies.

The device architecture of FIG. 4 includes a host 402, which is coupled to a Bluetooth segment 404, and a UWB segment 406. Host 402 is responsible for functions involving user applications and higher protocol layers, while Bluetooth segment 404 and UWB segment 406 are responsible for lower layer protocols. More particularly, Bluetooth segment 404 is responsible for Bluetooth specific communications with other devices, and UWB segment 406 is responsible for UWB specific communications with other devices.

Although a UWB connection may be set up through UWB transmission, other types of transmissions, such as Bluetooth, may be employed to set up the UWB connection. For example, Bluetooth segment 402 may be used to establish a UWB link without transmitting any UWB signals. Techniques for setting up such links are described in U.S. application Ser. No. 10/660,544, entitled "Method and System for Establishing a Wireless Communications Link," filed on even date herewith. This application is incorporated herein by reference in its entirety.

As shown in FIG. 4, Bluetooth segment 404 includes a host controller interface (HCI) 408, a link manager 410, a link controller 412, a Bluetooth transceiver 414, and an antenna 416. Link manager 410 performs functions related to Bluetooth link set-up, security and control. These functions involve discovering corresponding link managers at remote devices and communicating with them according to a link manager protocol (LMP). To perform these functions, LMP defines a set of messages, which are also referred to as protocol data units (PDUs). Link manager 410 exchanges these PDUs with link managers at remote devices.

Link manager 410 exchanges information with host 402 across HCI 408. This information may include commands received from host 402, and information transmitted to host 402. HCI 408 defines a set of messages, which provide for this exchange of information. Various HCI messages for performing the techniques of the present invention are described below with reference to FIG. 6.

Link controller 412 operates as an intermediary between link manager 410 and Bluetooth transceiver 414. Link controller 412 also performs baseband processing for Bluetooth transmission, such as error correction encoding and decoding. In addition, link controller 412 exchanges data between corresponding link controllers at remote devices according to physical layer protocols. Examples of such physical layer protocols include retransmission protocols such as the ARQ protocol.

FIG. 4 shows that Bluetooth transceiver 414 is coupled to an antenna 416. Transceiver 414 includes electronics that allow the device of FIG. 4 (in conjunction with antenna 416) to exchange wireless Bluetooth signals with devices, such as remote device 104. Such electronics include modulators and demodulators, amplifiers, and filters.

When the device of FIG. 4 engages in UWB communications, it employs the services of UWB segment 406. As shown in FIG. 4, UWB segment 406 includes a UWB module 418, a UWB transceiver 420, and an antenna 422.

UWB module 418 provides for the exchange of information across UWB links according to one or more protocol layers. For example, UWB module 418 may provide session management functionality to manage various UWB sessions. In addition, UWB module 418 may perform baseband processing, such as error correction encoding and decoding. In addition, UWB module 418 performs various link level protocols with remote devices according to physical layer protocols. Examples of such protocols include retransmission protocols, including the retransmission techniques of the present invention.

UWB transceiver 420 is coupled to antenna 422. UWB transceiver 420 includes electronics, which allow the device of FIG. 4 (in conjunction with antenna 422) to exchange wireless UWB signals with devices, such as remote device 104. For the transmission of UWB signals, such electronics may include a pulse generator. For the reception of UWB signals, such electronics may include timing circuitry and filters.

Figure 5:
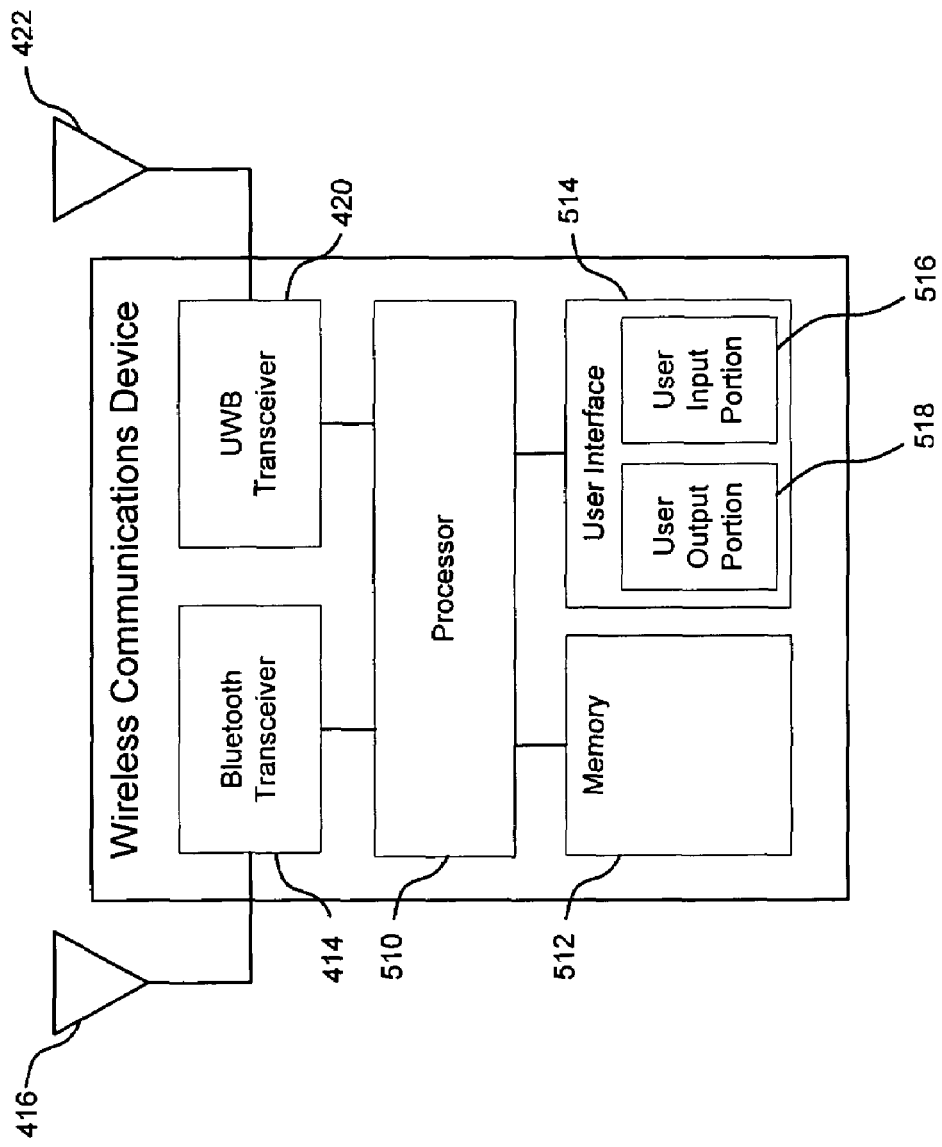
FIG. 5 is a diagram of an exemplary wireless communications device implementation.

The architecture of FIG. 4 may be implemented in hardware, software, firmware, or any combination thereof. One such implementation is shown in FIG. 5. This implementation includes a processor 510, a memory 512, and a user interface 514. In addition, the implementation of FIG. 5 includes Bluetooth transceiver 414, antenna 416, UWB transceiver 420, and antenna 422. Transceivers 414 and 420 may be implemented as described above with reference to FIG. 4.

As shown in FIG. 5, processor 510 is coupled to transceivers 414 and 420. Processor 510 controls device operation. Processor 510 may be implemented with one or more microprocessors that are each capable of executing software instructions stored in memory 512.

Memory 512 includes random access memory (RAM), read only memory (ROM), and/or flash memory, and stores information in the form of data and software components (also referred to herein as modules). These software components include instructions that can be executed by processor 510. Various types of software components may be stored in memory 512. For instance, memory 512 may store software components that control the operations of transceivers 414 and 420. Also, memory 512 may store software components that provide for the functionality of host 402, HCI interface 408, link manager 410, link controller 412, and UWB module 418.

In addition, memory 512 may store software components that control the exchange of information through user interface 514. As shown in FIG. 5, user interface 514 is also coupled to processor 510. User interface 514 facilitates the exchange of information with a user. FIG. 5 shows that user interface 514 includes a user input portion 516 and a user output portion 518. User input portion 516 may include one or more devices that allow a user to input information. Examples of such devices include keypads, touch screens, and microphones. User output portion 518 allows a user to receive information from WCD 102. Thus, user output portion 518 may include various devices, such as a display, and one or more audio speakers. Exemplary displays include liquid crystal displays (LCDs), and video displays.

The elements shown in FIG. 5 may be coupled according to various techniques. One such technique involves coupling transceivers 414 and 420, processor 510, memory 512, and user interface 514 through one or more bus interfaces. In addition, each of these components is coupled to a power source, such as a removable and rechargeable battery pack (not shown).

The device architecture discussed above with respect to FIGS. 4 and 5 provides one example of a Bluetooth- and UWB-enabled system. Other configurations may also be employed to implement the method and system herein. For example, UWB can be supported under the Bluetooth or other radio Media Access Control (MAC), with the link control being separate for UWB and the BT or other radio. An example of other device architectures is described in U.S. application Ser. No. 10/660,544, entitled "Method and System for Establishing a Wireless Communications Link," filed on even date herewith.

Figure 6:
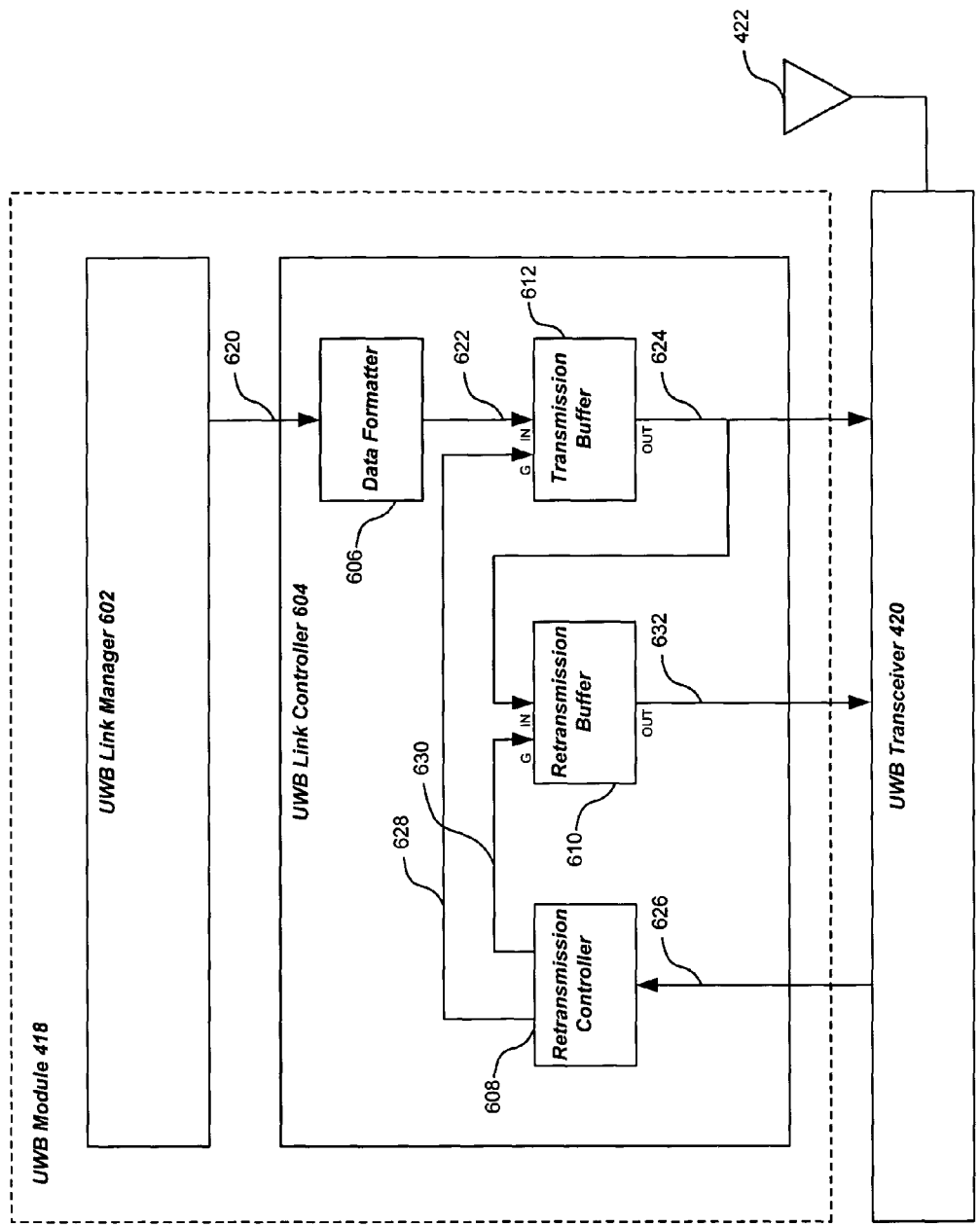
FIG. 6 is a block diagram showing an exemplary implementation of a UWB module.

FIG. 6 is a block diagram showing an exemplary implementation of UWB module 418. This implementation may be used to perform the techniques of the present invention. Accordingly, this implementation may be used in master device 102 to send transmissions and retransmissions, as described herein. UWB module 418 may be implemented in hardware, software, firmware, or any combination thereof.

As shown in FIG. 6, this implementation includes a UWB link manager 602 and a UWB link manager 604. UWB link manager 602 performs functions related to security, and session management. In addition, UWB link manager 602 may receive and process data for transmission to remote devices, such as slave devices 104. Such data may be received from host 402. Once processed, this data is sent to link controller 604 as transmission data 620.

FIG. 6 shows that link controller 604 includes a data formatter 606, a retransmission controller 608, a retransmission buffer 610, and a transmission buffer 612. Data formatter 606 receives transmission data 620 and places it in a format for transmission to one or more remote devices (e.g., slave devices 104). This may include placing data 620 into one or more packets 622, each having a header portion and a data portion. The header portion may include overhead information, such as a packet sequence number as well as a cyclical redundancy check (CRC) or other form of error correction coding. Accordingly, data formatter 606 may compute appropriate error correction codes.

Packets 622 are sent to transmission buffer 612 to await transmission. As shown in FIG. 6, transmission buffer 612 includes an input port (labeled "IN"), an output port (labeled "OUT"), and a gate port (labeled "G"). Transmission buffer 612 receives packets 622 and stores them in memory. Transmission buffer 612 outputs a stored packet 624 when it receives signal 628 at its gate port. Transmission buffer 612 stores and outputs packets in a first-in, first-out (FIFO) manner.

UWB transceiver 420 receives output packet 624 and sends it to remote devices (e.g., slave devices 104) as a UWB transmission. As described above with reference to FIGS. 3A and 3B, this UWB transmission may occur within a designated TDMA time slot.

Packet 624 is also sent to retransmission buffer 610. Thus, retransmission buffer 610 stores the most recently transmitted packet. As shown in FIG. 6, retransmission buffer 610 includes an input port (labeled "IN"), an output port (labeled "OUT"), and a gate port (labeled "G"). Retransmission buffer 610 outputs its stored packet(s) as retransmission packet 632 when it receives signal 630 at its gate port. Retransmission buffer 610 may store a single packet or multiple packets or remove stored packet(s) such as upon receipt of further packet (s) from transmission buffer 612, depending on the retransmission scheme or mechanism (e.g., Stop and Wait ARQ, Go-Back-N ARQ, Selective Repeat ARQ, etc.).

UWB transceiver 420 receives retransmission packet 632 and sends it to remote devices (e.g., slave devices 104) as a UWB retransmission. As described above with reference to FIGS. 3A and 3B, this UWB transmission may occur within a designated TDMA time slot.

As described above, transmissions and retransmissions are initiated by signals 628 and 630. More particularly, when signal 628 is sent to buffer 612, a transmission occurs. However, when signal 630 is sent to buffer 610 a retransmission occurs. As shown in FIG. 6, signals 628 and 630 are generated by retransmission controller 608.

Retransmission controller 608 receives an upstream signal 626 from UWB transceiver 420. From this signal, retransmission controller 608 identifies the presence and/or absence of acknowledgement transmissions from other devices, such as slave devices 104. If retransmission controller 608 identifies the absence of an acknowledgment transmission, it generates signal 630. However, if retransmission controller 608 determines that there is no absence of acknowledgment transmissions, it generates signal 628.

Figure 7:
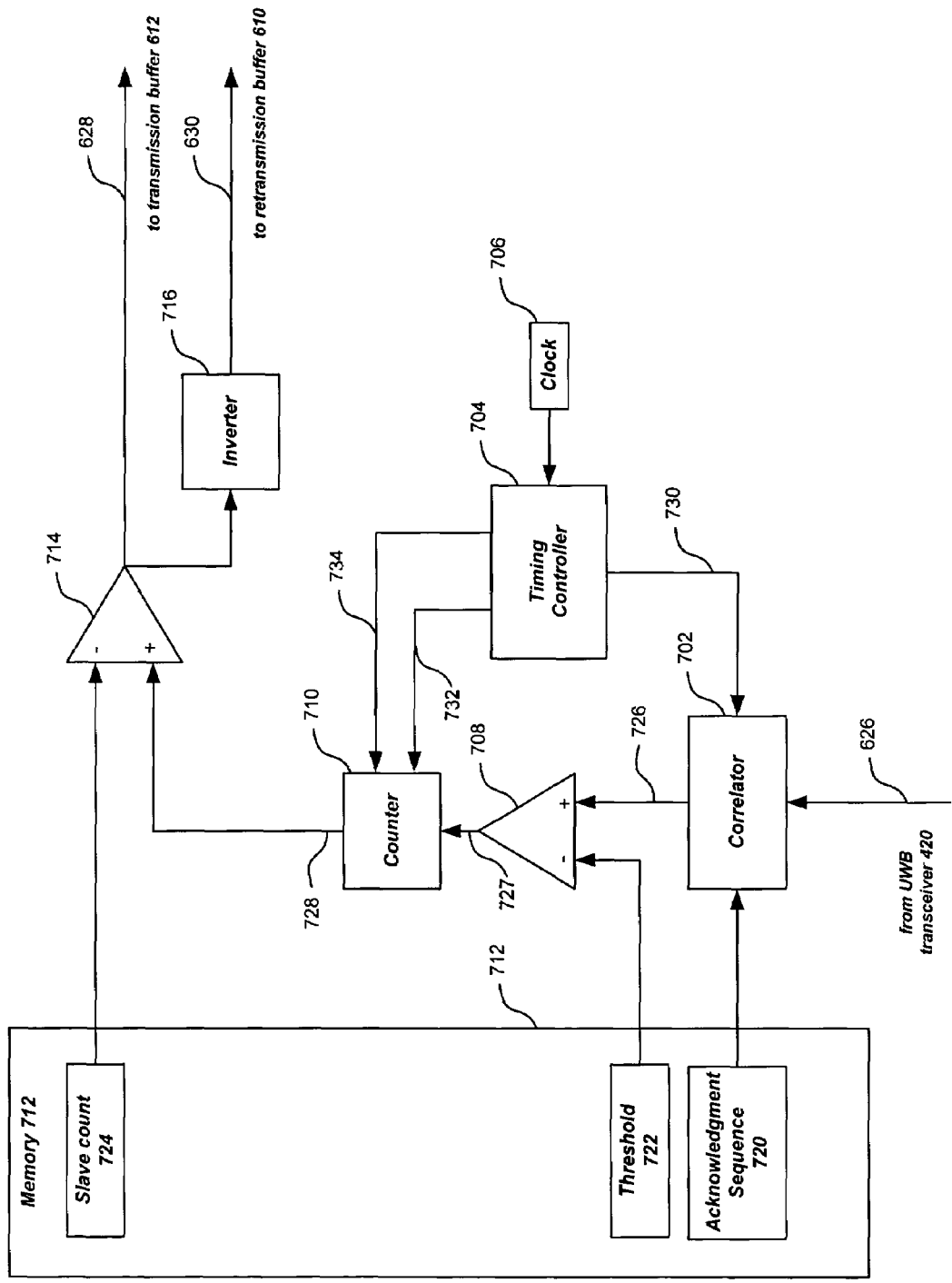
FIGS. 7 and 8 are diagrams showing exemplary implementations of a retransmission controller.
Figure 8:
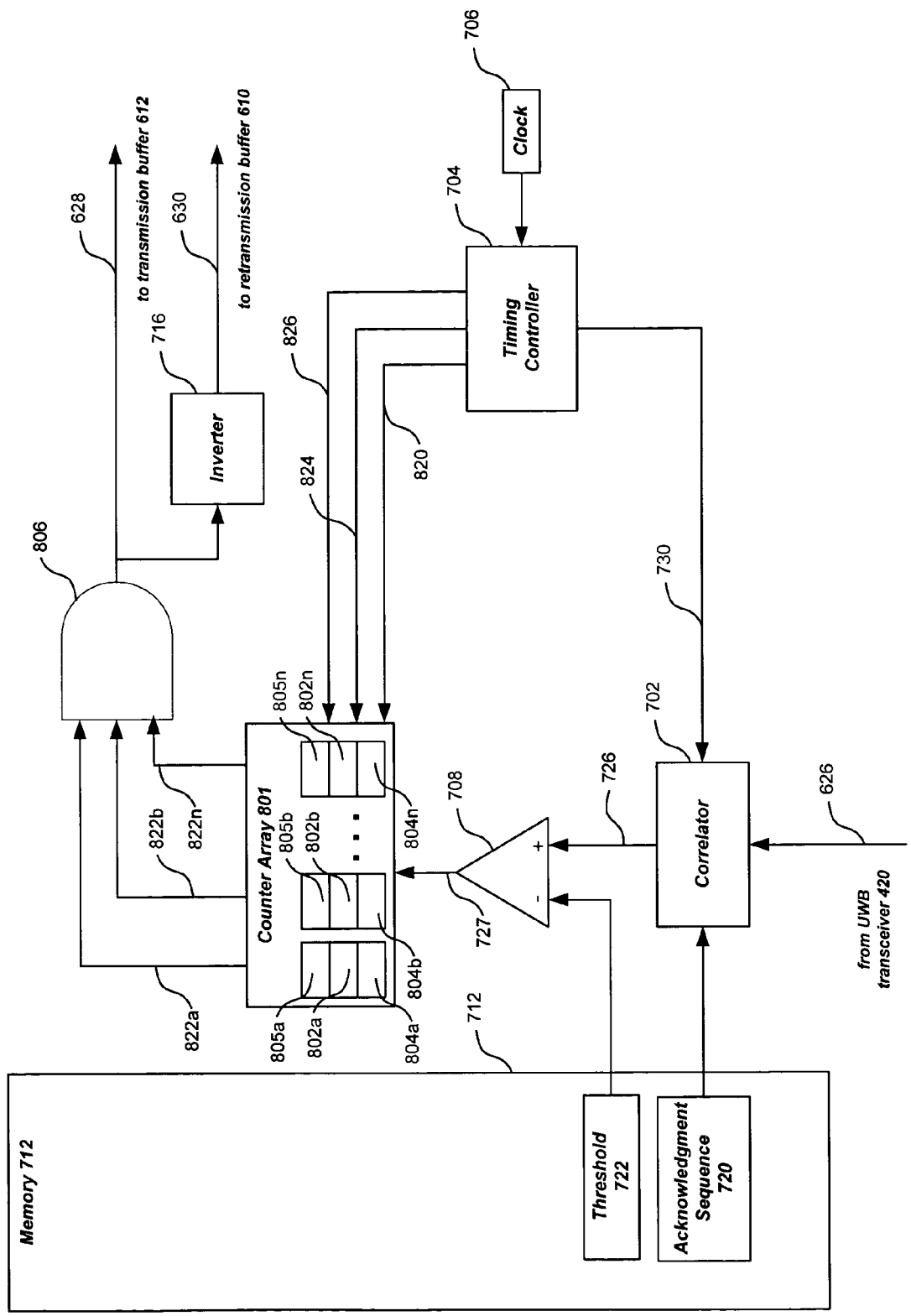

FIGS. 7 and 8 are diagrams showing exemplary implementations of retransmission controller 608. The implementation of FIG. 7 counts the number of acknowledgements received, while the implementation of FIG. 8 identifies the presence or absence of specific acknowledgments.

The implementation of FIG. 7 includes a correlator 702, a timing controller 704, a clock 706, comparators 708 and 714, a counter 710, a memory 712, and an inverter 716.

As shown in FIG. 7, correlator 702 receives upstream signal 626. Based on a start command 730 from timing controller 704, correlator 702 begins correlating upstream signal 626 with an acknowledgment sequence 720 stored in memory 712. With reference to the TDMA schemes described above, start command coincides with the beginning of an upstream time slot (e.g., time slot 206) that is allocated to upstream acknowledgment transmissions.

To perform this operation, correlator 702 performs various mathematical operations, such as multiplication and addition.

As a result, correlator 702 produces a correlation signal 726, which is sent to comparator 708. As described above, with reference to signal 320, correlation signal 726 indicates reception of an acknowledgment signal when it exceeds a predetermined threshold during a minislot.

Accordingly, to determine whether an acknowledgment signal is received, comparator 708 compares correlation signal 726 with a threshold 722 that is stored in memory 712. If correlation signal 726 is greater than or equal to threshold 722, then comparator 708 outputs a signal 727, which is sent to counter 710.

Counter 710, stores a counter variable that is incremented upon receiving signal 727. As shown in FIG. 7, counter 710 receives a reset command 732 from timing controller 704. This command clears the counter variable of counter 710. Accordingly, reset command 732 coincides with the beginning of upstream time slot (e.g., time slot 206) that is allocated to upstream acknowledgment transmissions. Counter 710 also receives an output command 734, which causes counter 710 to send the value of its counter variable to comparator 714 as signal 728. Output command 732 coincides with the end of the upstream time slot allocated to upstream acknowledgment transmissions.

Comparator 714 compares signal 728 with a slave count 724 that is stored in memory 712. Slave count 724 indicates the number of slave devices 104 participating in the multicast transmissions of master device 102. When signal 728 is greater than or equal to slave count 724, then comparator 714 outputs signal 628, which is sent to transmission buffer 612, as described above with reference to FIG. 6. When signal 728 is less than slave count 724, signal 628 is not output. However, in this case, inverter 716 generates signal 630, which is sent to retransmission buffer 610, as described above with reference to FIG. 6.

FIG. 7 shows that clock 706 is coupled to timing controller 704. Clock 706 is synchronized to the employed TDMA frame, and provides a timing references for controller 704 to output signals 730, 732, and 734.

FIG. 8 is a block diagram of a further implementation of retransmission controller 608. This implementation is similar to the implementation of FIG. 7. However, in FIG. 8, counter 710 is replaced with counter array 801. In addition, comparator 714 is replaced with AND gate 806.

For each slave device, counter array 801 stores an acknowledgment variable 802 a no acknowledgment variable 804, and a invalid slave device flag 805. For a particular slave device, acknowledgment variable 802 is incremented upon receiving signal 727 during the corresponding minislot. However, no acknowledgment variable 804 is incremented when counter array 801 does not receive signal 727 during this minislot.

Each variable 805 may be set to a non zero value when the corresponding no acknowledgment variable 804 exceeds a predetermined threshold. This information is used to prevent master device 102 from sending retransmissions to devices that are no longer active, or are no longer in communications proximity.

As shown in FIG. 8, counter array 801 receives a reset command 820 from timing controller 704. This command clears the acknowledgment variables 802 of counter array 801. Accordingly, reset command 820 coincides with the beginning of upstream time slot (e.g., time slot 206) that is allocated to upstream acknowledgment transmissions. In addition, counter array 801 receives control commands 824a-e, which are activated in particular minislots to indicate which variables can be adjusted.

Counter array 801 also receives an output command 826, which causes counter 710 to send signals 822 to AND gate 806. Signals 822 are generated by a logical OR operation performed on variables 802 and 805 for each slave device. Thus, AND gate 806 outputs signal 628 when acknowledgments are received from each slave device 104 that does not have a non-zero flag 805. When signal 628 is not output, inverter 716 generates signal 630, which is sent to retransmission buffer 610, as described above with reference to FIG. 6.

III. Operation

The present invention provides techniques for controlling a multicast transmission. Accordingly, FIG. 9 is a flowchart illustrating a retransmission process according to one embodiment of the present invention, which may be performed by the devices described above.

Figure 9:
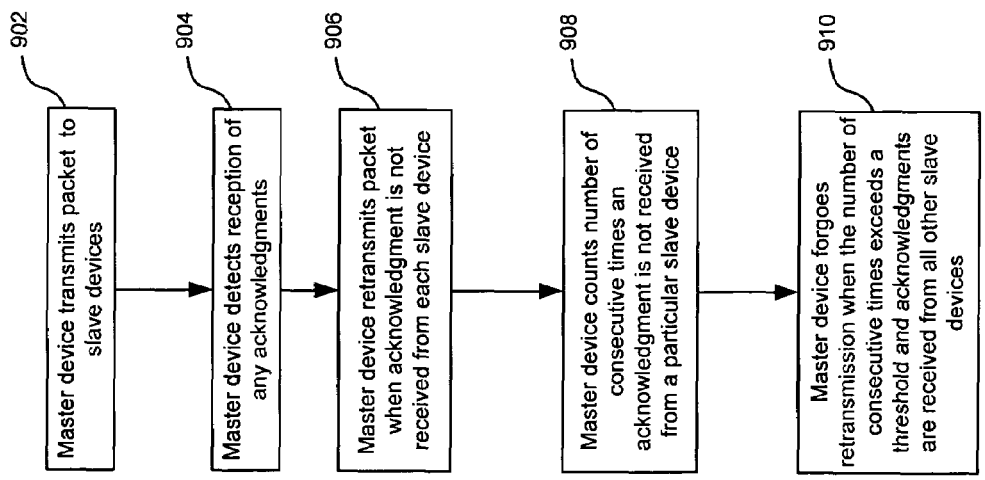
FIG. 9 is a flowchart illustrating a retransmission process according to one embodiment.

As shown in FIG. 9, this process includes a step 902, in which a master device (such as master device 102) transmits a data packet to multiple slave devices (such as slave devices 104) across a UWB wireless network.

In a step 904, the master device detects the reception of any acknowledgement transmissions from the slave devices. Each of these acknowledgement transmissions indicates reception of the data packet by a particular slave device.

In a step 906, the master device retransmits the data packet to the slave devices when an acknowledgment is not detected for each of the slave devices. The data packet may be selectively retransmitted, such as to a particular slave device for which an acknowledgment is not detected, or retransmitted to all slaves.

The process of FIG. 9 also includes steps 908 and 910. In step 908, the device counts the number of consecutive times an acknowledgement packet is not received from a particular one of the slave devices.

In step 910, the master device foregoes retransmitting the data packet when two conditions are satisfied. The first condition is that the number of consecutive times an acknowledgement packet is not received from one or more particular slave devices (individually or in combination for more than one device) exceeds a predetermined threshold. The second condition is that the master device detects an acknowledgement transmission from the each of the slave devices, except for the one or more particular slave devices.

IV. Conclusion

While various embodiments of the present invention have been described above, it should be understood that they have been presented by way of example only, and not in limitation. For instance, although examples have been described involving Bluetooth and UWB technologies, other short-range and longer range communications technologies are within the scope of the present invention.

For instance, the present invention is not limited to TDMA transmission. For instance, other multiple access techniques, such as code division multiple access (CDMA) may be employed. Also, while techniques of counting the number of consecutive times acknowledgments are not received, the present invention may alternatively detect whether no acknowledgments from a particular slave device are received for a predetermined time interval.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of controlling a multicast transmission, comprising:
   transmitting a data packet to a plurality of devices across an ultra wideband (UWB) wireless network;
   detecting the reception of any acknowledgement transmissions, wherein each acknowledgement transmission indicates reception of the data packet by a respective one of the plurality of devices;
   generating a correlation signal based on correlating received signals with a predetermined acknowledgment sequence;
   retransmitting the data packet to at least one of the plurality of devices when an acknowledgement is not detected for each of the plurality of devices;
   counting the number of consecutive times an acknowledgement packet is not received from a particular one of the plurality of devices; and
   forgoing retransmission of the data packet when said number of consecutive times exceeds a first predetermined threshold and when the correlation signal fails to exceed a second predetermined threshold during each of a plurality of time slots allocated to respective ones of the plurality of devices.

2. The method of claim 1, wherein the detecting comprises receiving said any acknowledgement transmissions from the UWB wireless network.

3. The method of claim 1, wherein the detecting comprises receiving said any acknowledgement transmissions from a transmission media different than the UWB wireless network.

4. The method of claim 3, wherein the different transmission media comprises Bluetooth.

5. The method of claim 1, wherein generating the correlation signal comprises correlating received signals with the predetermined acknowledgement sequence during a time slot allocated to the devices for acknowledgement transmission.

6. The method of claim 5, wherein the detecting further comprises:
   counting the number of times the correlation signal exceeds a predetermined threshold.

7. The method of claim 6, wherein said counting is performed during a time division multiple access (TDMA) time slot allocated to upstream transmissions from the plurality of devices.

8. The method of claim 6, wherein the retransmitting comprises retransmitting the data packet when the number of times the correlation signal exceeds the predetermined threshold is less than the number of the plurality of devices.

9. The method of claim 5, wherein the time slots comprise time division multiple access (TDMA) time slots, wherein the TDMA time slots are allocated to respective ones of the plurality of devices.

10. The method of claim 9, wherein the retransmitting comprises retransmitting the data packet when the correlation signal fails to exceed the predetermined threshold during each of the plurality of time division multiple access (TDMA) time slots.

11. A wireless communications device, comprising:
    a transmission buffer configured to store a packet for transmission across an ultra wideband (UWB) wireless network to a plurality of devices;
    a retransmission buffer configured to store a retransmission packet, the retransmission packet being previously transmitted across the UWB wireless network; and
    a retransmission controller configured to receive one or more acknowledgement transmissions from the plurality of devices,
    wherein the wireless communications device is configured
    to count the number of consecutive times an acknowledgement packet is not received from a particular one of the plurality of devices;
    to generate a correlation signal based on correlating received signals with a predetermined acknowledgment sequence; and
    to forgo retransmission of the data packet when said number of consecutive times exceeds a predetermined threshold and when the correlation signal fails to exceed a second predetermined threshold during each of a plurality of time slots allocated to respective ones of the plurality of devices.

12. The wireless communications device of claim 11, wherein said acknowledgement transmissions are received from a transmission media different then the UWB wireless network.

13. The wireless communications device of claim 12, wherein said the different transmission media comprises Bluetooth.

14. A system for controlling a multicast transmission, comprising:
    means for transmitting a data packet to a plurality of devices across an ultra wideband (UWB) wireless network;
    means for detecting the reception of any acknowledgement transmissions, wherein each acknowledgement transmission indicates reception of the data packet by a respective one of the plurality of devices;
    means for generating a correlation signal based on correlating received signals with a predetermined acknowledgment sequence;
    means for retransmitting the data packet to the one or more devices when an acknowledgement is not detected for each of the one or more devices;
    means for counting the number of consecutive times an acknowledgement packet is not received from a particular one of the plurality of devices; and
    means for forgoing retransmission of the data packet when said number of consecutive times exceeds a predetermined threshold and when the correlation signal fails to exceed a second predetermined threshold during each of a plurality of time slots allocated to respective ones of the plurality of devices.

15. The system of claim 14, further comprising means for receiving said any acknowledgement transmissions from a transmission media different than the UWB wireless network.

16. The system of claim 15, wherein the different transmission media comprises Bluetooth.

17. A computer-readable medium encoded with processing instructions for implementing operations for controlling multicast transmission, performed by a wireless communication device, the operations comprising:
    transmitting a data packet to a plurality of devices across an ultra wideband (UWB) wireless network;
    detecting the reception of any acknowledgement transmissions, wherein each acknowledgement transmission indicates reception of the data packet by a respective one of the plurality of devices;
    generating a correlation signal based on correlating received signals with a predetermined acknowledgment sequence;

retransmitting the data packet to at least one of the plurality of devices when an acknowledgement is not detected for each of the plurality of devices;

counting the number of consecutive times an acknowledgement packet is not received from a particular one of the plurality of devices; and forgoing retransmission of the data packet when said number of consecutive times exceeds a predetermined threshold and when the correlation signal fails to exceed a second predetermined threshold during each of a plurality of time slots allocated to respective ones of the plurality of devices.

18. The computer-readable medium of claim 17, wherein the detecting comprises receiving said any acknowledgement transmissions from a transmission media different than the UWB wireless network.

19. The computer-readable medium of claim 18, wherein the different transmission media comprises Bluetooth.

20. The wireless communications device of claim 11, wherein the retransmission controller is further configured to cause the retransmission buffer to send the retransmission packet to the plurality of devices across the UWB wireless network when an acknowledgement is not detected for each of the plurality of devices.

* * * * *